R.F. AMPLITUDE MEASURING SYSTEM

JERRE M. MURCHISON
BERND FALK
*INVENTORS*

DEMODULATOR
BLOCK DIAGRAM

I. F. PHASE AND AMPLITUDE MEASURING SYSTEM

JERRE M. MURCHISON
BERND FALK
*INVENTORS*

United States Patent Office 3,400,394
Patented Sept. 3, 1968

3,400,394
TARGET TRACKING RADAR SYSTEM PROVIDING DIRECT AND AUTOMATIC INDICATION OF TARGET SIZE
Jerre M. Murchison and Bernd Falk, Fort Worth, Tex., assignors to General Dynamics Corporation, Fort Worth, Tex., a corporation of Delaware
Continuation-in-part of application Ser. No. 451,109, Apr. 27, 1965. This application Aug. 29, 1966, Ser. No. 575,647
6 Claims. (Cl. 343—7)

ABSTRACT OF THE DISCLOSURE

A measurement system which accurately measures the amplitude and/or phase of pulsed radio frequency energies. Its prime feature is that the accuracy of measurement is essentially independent of non-linearities, gain variations, and drifts normally associated with I.F. amplifiers, detectors, etc. A reference pulse of known amplitude and phase is injected into the measuring circuits during a portion of the inter-pulse period when no other signals are present. The system compares the amplitude and/or phase of the reference pulse to the input pulse on a pulse-to-pulse basis; the error resulting from this comparison is used to adjust the amplitude and/or phase of the reference signal. Provision is made to precisely read out the amplitude and/or phase of the reference signal, this being the output of the measuring system.

---

The present invention is a continuation-in-part of our copending application Ser. No. 451,109 filed Apr. 27, 1965, and now abandoned and relates generally to an electronic circuit.

More specifically, the invention relates to an electronic circuit of the closed loop type, which is capable of accurately measuring phase and/or amplitude of an incoming radio frequency signal when employed in conjunction with a suitable radio frequency receiver. These measurements are accomplished through the generation of a pulsed internal reference signal or voltage of a specific phase and/or amplitude which is continuously compared to an incoming radio frequency signal at specific intervals. This permits detection of any variation in amplitude and phase of the incoming signal which causes the generation of an error signal proportional to the existing difference between the incoming and reference signals, thus continuously correcting the reference signal through a servo-controlled attenuator to maintain both inputs at the identical level or identical phase.

This reference signal is introduced at the appropriate point in the closed loop so as to cause the reference and incoming signals to be equally effected by any variations or nonlinearities in the operating components. This insures the accuracy of the resultant measurements in the incoming radio frequency signal in relation to the reference signal and dynamically presents these measurements on a suitable recording device as they relate to either time, range or azimuth.

As there are several embodiments of the present invention, only the embodiments concerning measurement of dynamic radar cross-section will be specifically set forth in this specification. However, it is to be expressly noted that the inventive loop may be employed in any RF instrumentation system. While it is known to those skilled in the art that the radar cross-section of a given target may be laboriously calculated if the various parameters in the radar range equation are known or can be measured, no dynamic means or method has heretofore been devised for automatically effecting highly accurate target size measurement and readout such as are embodied in the present invention.

An object of the present invention is to provide a measuring system which is essentially independent of gain variation of the active elements of a radar system, i.e., IF amplifier, detectors, etc. and to remove non-linearities by providing a means for the introduction of the reference signal at such a point in the circuitry as to allow any non-linearity in the loop to affect both signals in an identical manner to greatly increase amplitude and phase measurement accuracy.

Another object of the invention is to provide novel instrumentation for a target tracking radar system wherein radar cross-section measurements may be made with extreme accuracy and fidelity through a singular reference signal injection method made at RF level.

A further object of the invention is to provide a pulsed radar RF receiving system which substantially derives its functional network from existing operational elements of conventional target tracking radar with which it is integrated without imposing any deleterious effect upon or degrading the performance of the conventional radar.

Yet another object of the invention is to provide an adjunct radar RF receiving network of the above class and character which embodies a convenient means and method for compensating for range variations from the amplitude of the returned target pulse signals.

The various aspects and attendant advantages of the present invention will be apparent to those skilled in the art from the following specification taken together with the drawings, wherein.

Figure 1:
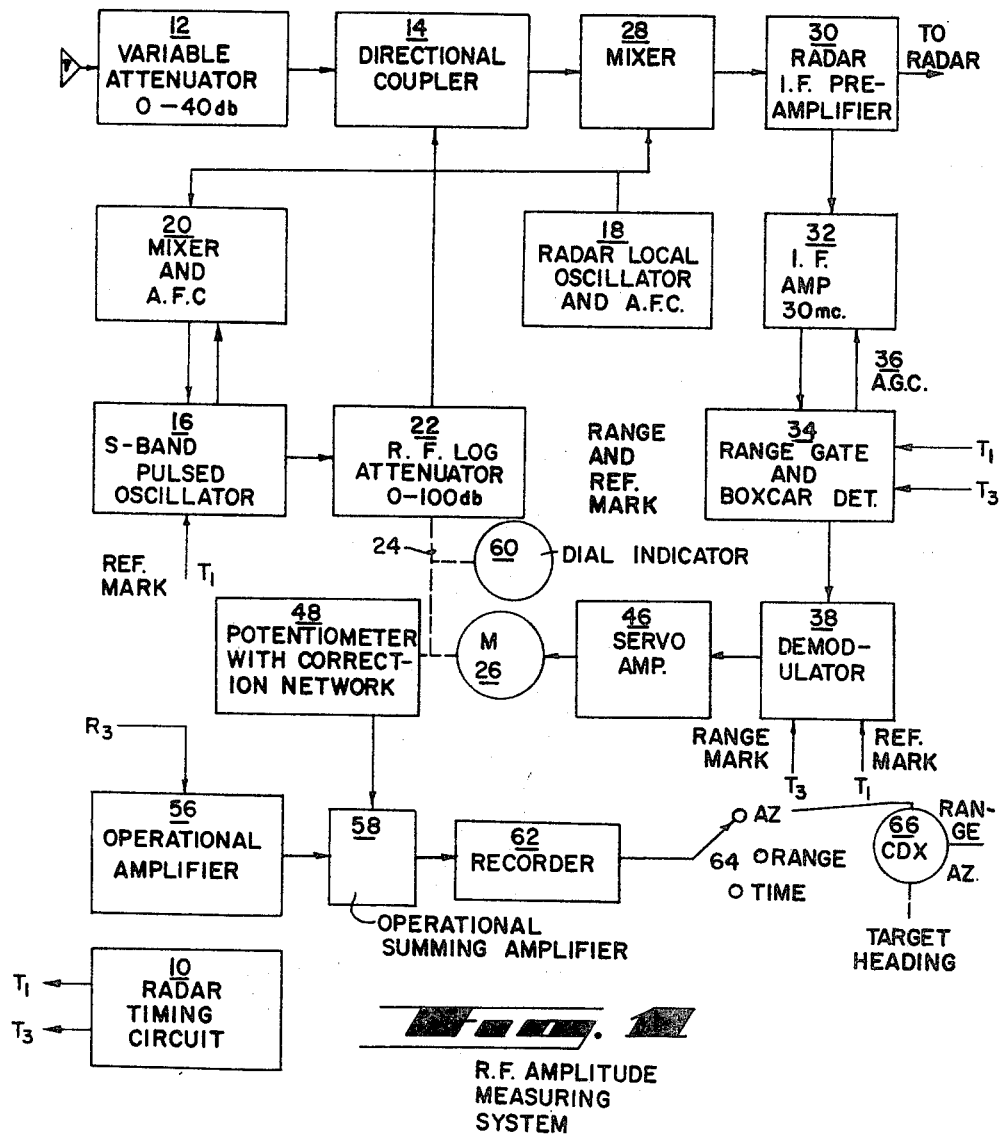
FIGURE 1 is a schematic block diagram of the RF and IF section of a conventional radar set embodying the dynamic amplitude measurement and readout instrumentation of the present invention.

Reference is now made to FIGURE 1, which diagrammatically illustrates the preferred embodiment of the present invention. The operation of the dynamic cross-section measuring system is begun by a triggering pulse $(T_o)$ emitted from timer 10. Trigger pulse $(T_o)$ causes a target tracking pulse radar transmitter (not shown) to emit a short pulse of radio frequency energy which is radiated into space by a suitable antenna. The antenna is of the conical scan type generally associated with target tracking radars, which shapes the radio frequency energy into a pencil-like beam. On being reflected by some object the pulses are re-radiated in various paths and at varying intensities depending upon the material, shape and/or protuberances of the object. The re-radiated energy is detected by the radar antenna and channeled into a suitable radar receiver by a conventional duplexer. The present invention is interposed between the duplexer and mixer in the circuitry of a conventional radar, such as the model M.P.S. 9 radar. The present invention is hereinafter referred to as the sigma servo, sigma being the Greek character in the radar equation for cross-section and servo denoting a closed loop circuit. The purpose of the invention is to extract radar signal amplitude in terms of either range, azimuth or time to permit radar cross-section measurement.

Figure 4:
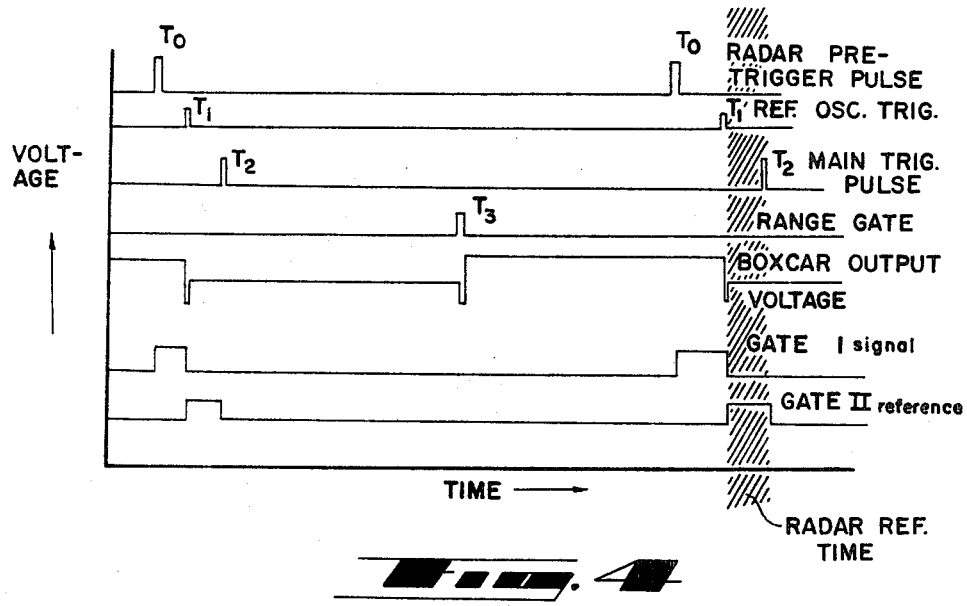
FIGURE 4 is illustrative of the timing diagram of the present invention in chronological sequence.

The re-radiated radio frequency energy after reception at the antenna next enters variable attenuator 12. It then goes to directional coupler 14 where it is combined with radio frequency reference signal. This reference signal is generated by an S-band pulsed oscillator 16 which is gated on only at the reference time as indicated in FIGURE 4. This gating is effected by reference oscillator triggering pulse $T_1$, also generated by timer 10. (Note timing designations occur in chronological order as indicated by subscripts.) The timing sequence is begun by radar pre-trigger pulse $T_0$. The frequency of oscillator 16 is controlled by an automatic frequency control circuit. The frequency of this reference oscillator 16 is held at the radar transmitter frequency by mixing the signal from radar local S oscillator 18 and reference S oscillator 16 signal in mixer and AFC circuit 20, which generates a correction voltage which is applied to oscillator 16 to thereby maintain the difference frequency at 30 megacycles. Such reference pulse is passed through radio frequency attenuator 22, which also maintains the energy level or signal strength of the reference signal at the same level as the target echo signal through movement of its rotatable shaft 24 (schematically shown) whose position is controlled by a hereinafter described servomotor 26.

Attenuator 22 has a fixed range of attenuation as permitted in the hereinafter described closed loop. Thus, if the radar operator visually notes that the target echo is increasing in strength, due to closing target range and associated increasing size, so that attenuator 22 reaches its minimum attenuation and causes the recording instruments to go off scale, he may manually change the scale by increasing the attenuation of variable attenuator 12 to bring the echo signal to a compatible level, thereby bringing the signal strength back to a level which will permit attenuator 22 to function normally and the recording devices to read on scale.

The RF echo signal and RF reference signal, pass from directional coupler 14 to mixer 28. Mixer 28 takes the echo and reference signals and heterodynes them to an intermediate frequency, which is easier to work and which is common practice in superheterodyne receivers. The heterodyning signal is generated in local oscillator 18 and subsequently introduced into mixer 28. The signals, now at intermediate frequency, enter the IF strip, comprised of radar intermedaite frequency pre-amplifier 30, where they are amplified. After initial amplification, the intermediate frequency signals enter IF amplifier 32 at 30 megacycles where they are again amplified. The echo signal and the reference signal now enter the range gate and boxcar detector 34. The range gate section employs a conventional radar gate which may be moved in respect to time and allows the operator to manually select the particular peak or target in the incoming RF envelope he desires to investigate. The range gate localizes the particular peak and is actuated by trigger pulse $T_3$. Outputs of the range gate are thus two 30-megacycle pulses, the target pulse and reference pulse, which are subsequently fed to boxcar detector 34. Boxcar detector 34 is utilized to detect the peak signal level of each pulse and to retain this value as an output until the subsequent pulse is received. When the next pulse is received this output level is first reduced to zero (as illustrated in FIGURE 4) and is then immediately elevated to the new peak signal level. Therefore, the output of the boxcar detector becomes a voltage having a rectangular wave form, the magnitude of which is proportional to the difference of the amplitudes of the unknown and reference signals which is an indication that an error exists. A description of the operation of boxcar detector 34 may be found in Landee, Davis & Albrecht, Electronic Designers Handbook, McGraw-Hill Book Company, 1957; pages 12–19. Automatic gain control (AGC) 36 is implemented so that it controls the IF amplifier gain as a function of boxcar voltage level. The function of the AGC resides in its endeavor to hold the average amplitude of the target and reference signals on the output side of the IF amplifier at a constant level for insertion into boxcar detector 34.

During each interpulse period, demodulator 38 sequentially samples the boxcar signal level resulting from the target signal, and then the boxcar signal level resulting from the reference signal, each for a 20-microsecond time interval, which sequential sampling is accomplished by a series of trigger pulses generated by timer 10. Trigger pulse $T_0$ causes demodulator 38 to sample the level or value of the target echo signal and shortly thereafter trigger pulse $T_1$ causes the same demodulator to sample the reference signal value or level.

Figure 5:
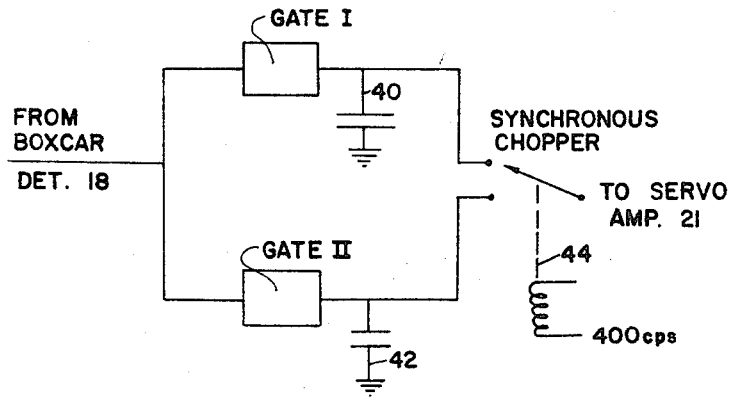
FIGURE 5 is a schematic diagram of the demodulator employed in both amplitude and phase measuring systems in accordance with the present invention.

Operation of the demodulator circuit is further explained with the aid of FIGURES 4 and 5. FIGURE 4 shows the voltage waveform at the input to the demodulator as a function of time (boxcar output voltage). Also shown are the gate timing signals used by the demodulator (gates I and II). FIGURE 5 shows a block diagram of demodulator 38. The gates are activated at the times shown in FIGURE 4. Thus, the sequential voltage levels due to target and reference pulses existing at the input of the demodulator are converted to two voltages existing on separate capacitors 40 and 42, see FIGURE 5. The electromechanical chopper 44 converts the difference of those voltages (the difference between target and reference signals) to a 400 c.p.s. signal which is used to drive the servo through servo amplifier 46 and motor 26. Servo motor 26 rotates in a direction dependent on the error voltage polarization. Output shaft 24 of servo motor 26 is mechanically connected to radio frequency attenuator 22. As actuation of servo motor 26 is a function of the error signal, the attenuation of attenuator 22 is proportional to the integral of the error signal, and thereby controls the amount of attenuation it produces, thus closing the servo loop, and causing the target signal and reference signal to maintain the same value or level.

Radio frequency attenuator 22 functions as the sensor in obtaining a logarithmic function of received signal strength since it converts the linear rotational input of the servo motor shaft 24 to a logarithmic attenuation. The shaft position is thus a true logarithmic function of the reference signal level if the attenuator is logarithmic. Dial indicator 60 reads out the received signal strength and is attached at an appropriate point in the attenuator gear train.

True logarithmic attenuation, from linear shaft rotation, cannot always be obtained from conventional attenuators. Therefore it is necessary to correct the readout of the shaft position through the potentiometer 48 having a correction network. This is necessary in order to effect a linear output in decibels. This correction is effected by the procedure of matching the resistance curve of potentiometer 48 to the attenuation curve of RF attenuator 22. Thus, when the attenuator and potentiometer have been mechanically coupled, the potentiometer resistance ratio at its associated wiper arm becomes a true logarithmic function of received signal strength; it then being linear in decibels. Since direct current voltage is placed on the above mentioned potentiometer, the wiper arm voltage may be recorded directly for radar cross-section measurements where range to target does not vary.

Figure 2:
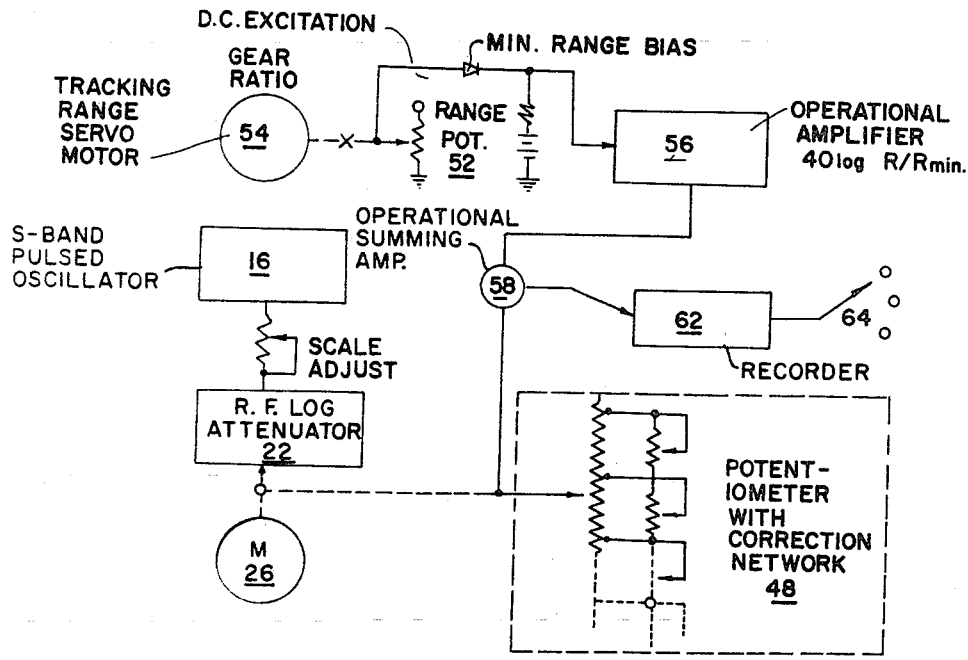
FIGURE 2 is a block schematic wiring diagram of a radar range normalization network as employed in the invention.

Since target range changes constantly in dynamic measurements, as in the instance of the present invention, the range variable must be removed. Such removal is effected by the range normalization circuitry shown in FIGURE 2. In this circuit, output is normalized so that all data generated by the measurement system is related to a particular range.

The radar range equation relates the parameters pertinent to received signal strength at the input of a radar receiver;

$$S = \frac{P_r G_r^2 \lambda^2 \sigma}{(4\pi)^3 R_t^4} \quad (1)$$

where

S is the received signal strength
$P_r$ is the transmitter power
$G_r$ is the radar antenna gain
$\lambda$ is the wave length
$\sigma$ (sigma) is the target cross-section, and
$R_t$ is the range to target.

Thus, rearranging the equation, $$\sigma = \frac{(4\pi)^3}{P_r G_r^2 \lambda^2} S R_t^4 = K S R_t^4 \quad (2)$$

where K is a constant representing the terms normally fixed in a radar system. In order to obtain cross-section sigma, independent of target range, the range variable must be removed from the measurement.

Converting Equation 2 so that the variables may be represented in decibels by taking the logarithm of both sides of the equation, the following results are obtained:

$$10 \log \sigma = 10 \log K + 10 \log S + 40 \log R_t \quad (3)$$

letting $\sigma' = 10 \log \sigma$
$K' = 10 \log K$
$S' = 10 \log S$
$R_t' = 40 \log R_t$ $$\sigma' = K' + S' + R_t' \quad (4)$$

where all quantities are measured in decibels.

The measurement of S' has been described and is the potentiometer correction output of network 48. K' is a constant which is determined at the time of calibration as subsequently described. A voltage proportional to $R_t'$ is obtained as described below.

Figure 3:
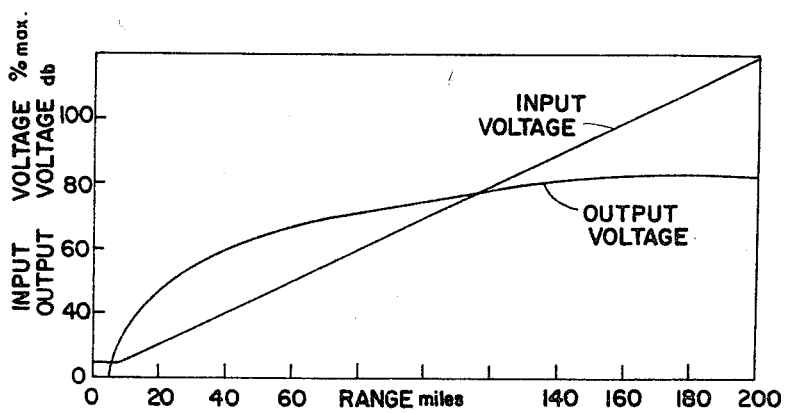
FIGURE 3 is a graphical representation of the input vs. output voltage in db of an operational amplifier as employed in the invention.

Potentiometer 52 is coupled to tracking range servo motor 54 in the radar through the proper gear ratio to permit use of the full potentiometer range over the radar tracking range. A DC signal which varies linearly with tracking range is thus obtained from potentiometer 52. This linear function is converted to a logarithmic function in operational amplifier 56. Operational amplifier 56 incorporates a diode breakpoint generator in its feedback loop so chosen that the output voltage is proportional to the logarithm of the input voltage. This type of operation is discussed in Jackson, A. S., "Analog Computation," McGraw-Hall Book Company, 1960, pages 485–489. The necessary output logarithmic function is $40 \log R_t = R_t'$. This function is utilized to convert the range information to proper form for summation with potentiometer 48 output. FIGURE 3 graphically shows the values of the operational amplifier input and output functions.

The method by which voltages proportional to K', S' and $R_t'$ are obtained have now been described. In order to satisfy Equation 4 to obtain $\sigma'$ the above mentioned three voltages must be added. This addition is performed by summing operational amplifier 58 (see FIGURE 1) used as a summing amplifier. The output of summing operational amplifier 58 is the required output voltage which is fed to a suitable X–Y recorder 62, such as Scientific Atlanta Recorder, Series 1520, which recorder has the amplitude measurement emitted by the summing operational amplifier applied to one axis of the recorder and either azimuth, range, or time taken from the main radar set applied to the other axis of the recorder, thereby permitting a cross-section measurement in terms of either azimuth, range or time. Thus selection of either of the above functions is accomplished by switch 64.

Switch 64 is a device which selects the signal which is applied to the abscissa of the recorder 62. The recorder abscissa input may be selected to be azimuth or range voltages from the radar, or a voltage which is proportional to time. This switch provides the multiple capability of recording the radar cross-section of a target as a function of target aspect angle (azimuth), radar to target range, or time. Recordings are normally made of radar cross-section vs. azimuth.

The device of the present invention may be readily integrated with any advanced conventional tracking radar system without substantially changing existing circuitry, a variable attenuator and directional coupler merely being installed between duplexer and mixer. The remainder of the integration process simply evolves from use of signals already present in conventional radar.

The range gate and system pretrigger are obtained from the conventional radar's synchronizer unit; range information being available as a shaft position in the range computer unit and radar local oscillator output being fed to the mixer. The IF signal is obtained in the radar IF prior to range gating.

Target azimuth angle information is needed to permit the position of the recorder paper to vary with target azimuth. For example, if the radar antenna is referenced so that zero degree is due north, then the target azimuth angle $\theta$ is:

$\theta$ = antenna angle + 180 degrees − target heading.

This equation is implemented by obtaining azimuth information from the azimuth synchro and the result is utilized as one input to a differential synchro 66 (CDX); the second input to the differential being target heading which is inserted as a shaft position. Target heading is then inserted either manually or automatically; a data link being required for automatic azimuth positionings. Thus, the differential output is target azimuth angle.

The maximum range at which a specific cross-section target may be tracked with a given conventional radar is calculated by using the standard radar range equation previously referred to. This calculation indicates that a target one square meter in cross-section area can be tracked to approximately 35 miles with the M.P.S. 9 radar. Ground return and high side lobe return prevent the use of radar below aproximately five miles for cross section measurements. Therefore integration of the present device into conventional radar provides dynamic cross-section measurement capability for the resulting system of 5 to 35 miles in range on a one-square meter target.

The above described radar cross-section measuring system can be employed to measure the radar cross-section of a target which is being tracked by the radar, in $dbm.^2$, i.e., decibels referred to one square meter, when calibrated against a reference of a predetermined or standard radar cross-section.

As thus described, the present invention resides in a means and method for instrumenting a conventional tracking radar system and to thereby endow it with added capability for effecting real time, dynamic radar cross-section measurement, display or readout and recording. Such facility includes a radar receiver to which is applied a pulse echo from the object target to be measured and to which is simultaneously applied a reference signal adjusted in magnitude by a servo-controlled attenuator. This pair of signals are conducted from the receiver to gating and sampling circuitry and thus provide an error signal to a servo amplifier which in turn controls a servo motor to reposition the variable attenuator which modifies the amplitude of the reference signal to null the servo. When the servo achieves a null, the angular displacement of the motor shaft is sensed by a potentiometer driven thereby, is equivalent to and thus a measure of, echo signal amplitude. Gating and sampling circuitry operates concurrently with radar display and tracking circuits; the latter being fed in parallel from the receiver IF system input. Appropriate range normalization instrumentation provides accurate and convenient means for removing range variations from the returned signal. Through proper system calibration and operation, peak measurement errors of less than 2.0 db are realized.

It is to be understood, of course, that the foregoing disclosure relates to only a preferred embodiment of the invention and that it should be construed to cover all changes and modifications of the example of the invention herein chosen and described for the purposes of the disclosure, which do not constitute departures from the spirit and scope of the invention. For example, the presently described measurement technique is also readily adaptable for simultaneous measurement of both amplitude and phase of the received radio frequency signals.

Figure 6:
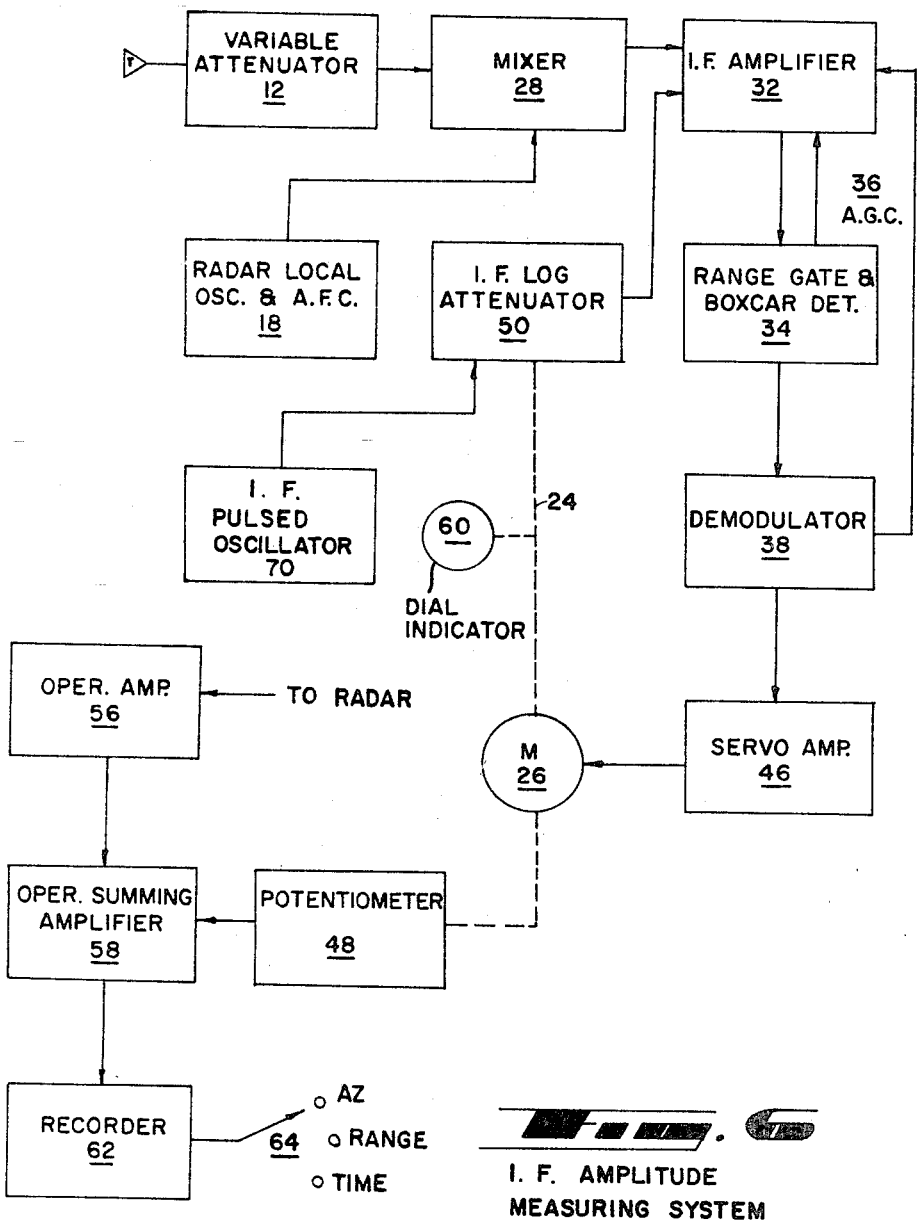
FIGURE 6 is a block diagram of a second embodiment of the present invention wherein the reference pulse is fed directly into the IF strip.

As above described, the first embodiment employs the injection of a radio frequency reference signal into directional coupler 14 and mixer 28. It is to be noted that in this particular circuitry any variation in radar operating frequency results in a required similar variation in the frequency of S-band pulsed oscillator 16 thereby causing a necessary replacement of the oscillator and radio attenuator 22 with those of the proper frequency. In order to overcome this required oscillator and attenuator replacement, a second embodiment, illustrated in FIGURE 6, is herein disclosed. This embodiment possesses all of the above mentioned advantages and components, with exception of S-band pulsed oscillator 16, directional coupler 14, and mixer and A.F.C. 20, which are no longer required. This system operates in the identical manner as the first embodiment, except that the reference signal is injected at a fixed intermediate frequency. It will be noted that intermediate frequency pulsed oscillator 70 replaces the S-band pulsed oscillator and a suitable servo driven IF attenuator 50 is substituted for RF attenuator 22 and the reference is injected directly into IF amplifier 32 as illustrated in FIGURE 6. Since this IF frequency reference signal is fixed and subsequently introduced into IF amplifier 32, variations in radar operating frequency do not require readjustment of the frequency of such reference signal. For purposes of explanation, reference is made to the timing diagram illustrated in FIGURE 4 which is applicable to the second embodiment of the present invention.

In many advanced radio frequency receiving systems, it is desirable to measure both amplitude and phase of received radio frequency energy. Thus a third embodiment is hereinafter disclosed which measures amplitude and phase of input energy by the same method described above, i.e., by comparison of input signals to a reference signal of either radio frequency or intermediate frequency, and continuously adjusting the reference signal so that it equals, in amplitude and phase, the input. This phase and amplitude measuring system is illustrated by the block diagram of FIGURE 7. This system utilizes an intermediate frequency reference signal such as that disclosed in the second embodiment. In this particular system, it is assumed that the transmitter frequency determining method employs circuitry which produces a phase coherent signal at the intermediate frequency of the measuring system, as above described.

Figure 7:
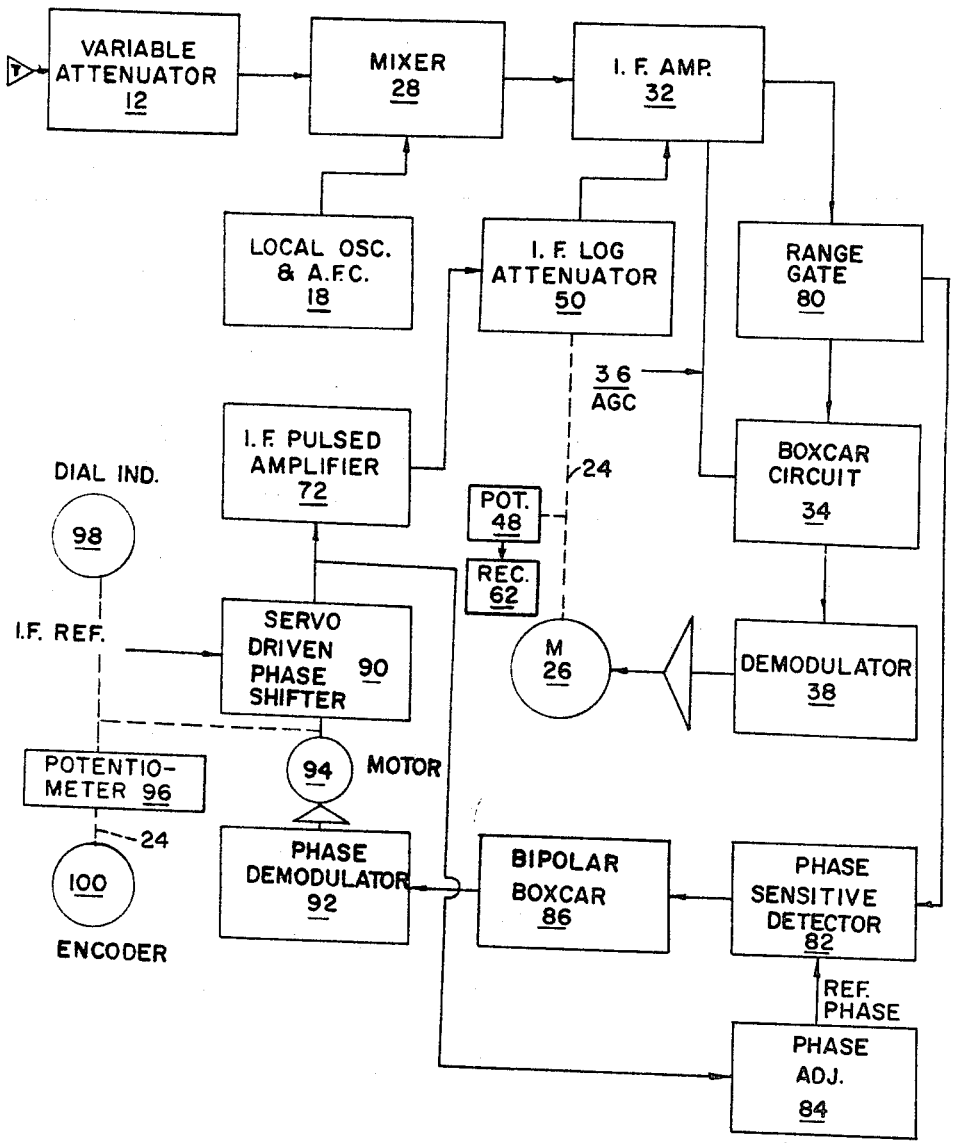
FIGURE 7 is a block diagram of a third embodiment of the present invention illustrating the method for obtaining amplitude and phase measurements.

Referring therefore to FIGURE 7, the operation is very similar to that described in the first embodiment, IF pulsed amplifier 72 being substituted for pulsed oscillator 16. Since range gating is done at the intermediate frequency, phase information is preserved through range gate 80. The pulsed signal, again at the intermediate frequency, is fed to phase sensitive detector 82 and compared with the phase of the phase detector reference signal from phase adjuster 84. For typical diagram and operation of phase sensitive detector 82 see reference, S. N. Van Voorhis, "Microwave Receivers" Radiation Laboratory Series, McGraw-Hill Book Co., 1948, pages 597–601. The reference input of phase sensitive detector 82 has phase adjuster 84 connected in the IF reference signal line to provide adjustment of the phase detector reference phase for proper operation. The positive or negative pulse output of phase detector 82 is dependent on whether the intermediate frequency signal is in phase or out of phase with the reference signal. Bipolar boxcar 86 is used to maintain the resultant positive or negative pulse potential until a subsequent pulse arrives, as in the first embodiment. The amplitude of the boxcar output voltage is proportional to the phase difference of the echo signal and reference voltage. Amplitude information is processed as described in the second embodiment.

At a time sufficiently delayed after main bang ($T_2$) so that no normal signals of interest are present, a pulsed signal derived from the reference IF is fed to the IF system through reference servo driven intermediate frequency attenuator 50 and a servo driven phase shifter 90, such as Merrimac precision resolver, Model R–60. The amplitude measuring loop processes this signal as previously described. This reference pulse is also processed through the phase channel resulting in a rectangular wave output from the bipolar boxcar 86 in which the voltage output is proportional to the phase difference between the echo and the reference signal. The polarity of the rectangular wave will be proportional to the phase error direction. This rectangular wave is processed in the phase demodulator 92, illustrated in FIGURE 5, as previously described and used to drive a servo motor 94. Motor 94 will operate until the phase of the reference pulse and the echo signal are equal. Potentiometer 96, dial indicator 98, and digital encoder 100 may be connected to motor 94 through suitable gearing to readout phase.

In summary, the device and method of the present invention is drawn to a sigma servo circuit for measuring dynamic radar cross-section as a function of time, range or azimuth wherein the amplitude and/or phase of the received echo signal is sequentially compared to the amplitude and/or phase of an internally generated reference signal whereupon any variation between the reference and received signals results in an error signal proportional to the variation, the error signal or signals being then fed to servo motors controlling the phase and amplitude of the reference signal responsive to the prior derived difference until a null is achieved. The resultant shaft position is subsequently read out by potentiometers, dials, and/or digital shaft encoders.

What is claimed is:

1. A method for measuring a radio frequency vector comprising the steps of:
    (a) time sequentially measuring the amplitude and phase of an input signal and of a reference signal;
    (b) detecting the differences between said input and reference signals;
    (c) readjusting the reference signal amplitude and phase in response to the detected difference signals;
    (d) continuing said readjustment until the difference in detected signals is zero, and then
    (e) reading out the amplitude and phase of the reference signal.

2. A measuring system comprising:
    (A) means sequentially measuring amplitude of an unknown and a reference signal to generate an error signal, wherein said measuring means comprises:
        (1) an I.F. amplifier;
        (2) means selecting and localizing particular range and reference pulse peaks, detecting peak signal level of each pulse and retaining each pulse until the next pulse is received and having as an output a voltage of rectangular wave form the magnitude of which is proportional to the difference of the amplitudes of the unknown and reference signals;
        (3) means holding the average amplitude of the range and reference signals at a constant level by controlling the gain of said I.F. amplifier as a function of the voltage level of said pulse retaining means;

(4) means sequentially sampling the signal level of said retaining means giving an error signal resultant from the difference between the signals; and (B) means utilizing the resultant error signal to automatically vary the amplitude of the reference signal to cause the unknown signal and the reference signal to be equal in amplitude, wherein said utilizing means comprises:

(1) means responsive to the error signal generated by said sequential sampling means;

(2) a reference signal generating means;

(3) attenuator means acting upon the signal generated by said reference signal generating means and responsive to said sequential sampling responsive means operative to cause the unknown and reference signals to maintain the same value; and (4) means sensing said attenuator action.

3. The system defined in claim 2 wherein:

(A) said selecting, localizing and detecting means comprises:

(1) a range gate localizing a particular pulse peak;

(2) a boxcar detector detecting the peak signal level of each pulse localized by said range gate and retaining the pulse until it receives the next subsequent pulse;

(B) said sequential sampling means comprises:

a demodulator sequentially sampling the range and reference signal levels from said boxcar detector, converting the signals to separate voltages resulting in an error signal equal to the difference between the range and reference signals;

(C) said means responsive to said sequential sampling means comprises:

(1) a servo amplifier amplifying the error signal received from said demodulator;

(2) a servo motor responsive to said servo amplifier and driven thereby in the appropriate direction, the movement of said motor being a function of the error signal; and (3) a potentiometer having a correction network operative to correct the readout of the servo motor shaft resultant in a linear correction output.

4. A measuring system comprising:

(A) means sequentially measuring the phase and amplitude of an unknown and a reference signal to generate phase and amplitude error signals;

(B) means utilizing the resultant error signals to automatically vary the phase and amplitude of the reference signal so as to cause the unknown and reference signals to be equal in phase and amplitude.

5. The measuring system defined by claim 4 wherein: said sequential measuring means comprises:

(1) means sequentially measuring the amplitude of an unknown and a reference signal to generate an amplitude error signal, and (2) means sequentially measuring the phase of an unknown and a reference signal to generate a phase error signal.

6. The system defined by claim 5 wherein:

(A) said sequential amplitude measuring means comprises:

(1) a range gate operative to localize a particular pulse peak, (2) a boxcar detector operative to detect the peak amplitude signal level of each pulse localized by said range gate and to retain the pulse until the next subsequent pulse is received;

(3) means holding the average amplitude of the range and reference signals at a constant level by controlling the input to said range gate as a function of the voltage level of said boxcar detector;

(4) a demodulator sequentially sampling the signal level of said boxcar detector giving an error signal resultant from the difference between the unknown and reference signals;

(B) said sequential phase measuring means comprises:

(1) a range gate operative to localize a particular pulse peak;

(2) a phase sensitive detector responsive to the signal from said range gate operative to compare the unknown and reference signals;

(3) means controlling the reference signal input phase to said phase sensitive detector;

(4) a bipolar boxcar circuit operative to maintain the pulse potential from said phase sensitive detector until arrival of a subsequent pulse;

(5) a phase demodulator sequentially sampling the signal level output of said bipolar boxcar circuit operative to generate an error signal resultant from the phase difference between the unknown and reference signals;

(C) said error signal utilizing means comprises:

(1) a servo motor responsive to the error signal generated by said amplitude demodulator;

(2) a servo motor responsive to the error signal generated by said phase demodulator;

(3) a pulsed amplifier operative to generate a reference signal;

(4) attenuator means responsive to said reference signal pulsed amplifier and said amplitude error responsive servo motor to cause the unknown and reference signals to maintain the same phase;

(5) a phase shifter responsive to said pulse error responsive servo motor and operative to make the reference and unknown signals equal in phase, and (6) means to determine shaft angle of each said servo motor to obtain both amplitude and phase readout.

References Cited

UNITED STATES PATENTS

| 2,565,892 | 8/1951 | Stanton | 324—98 |
| 2,911,592 | 11/1959 | Colker et al. | 324—99 X |
| 3,030,620 | 4/1962 | Roberts et al. | 324—83 X |
| 3,154,741 | 10/1964 | Attwood. | |

OTHER REFERENCES

Skolink: Radar Systems, McGraw-Hill (1962), pp. 438–9.

Thaler & Brown: Feedback Control Systems, McGraw-Hill (1960), pp. 392–3.

RICHARD A. FARLEY, *Primary Examiner.*

C. L. WHITHAM, *Assistant Examiner.*